Patented Dec. 6, 1932

1,890,430

UNITED STATES PATENT OFFICE

RALPH P. PERKINS AND PETER S. PETRIE, OF MIDLAND, MICHIGAN, ASSIGNORS TO THE DOW CHEMICAL COMPANY, OF MIDLAND, MICHIGAN, A CORPORATION OF MICHIGAN

PROCESS FOR THE PRODUCTION OF PRIMARY AROMATIC AMINES OF THE BENZENE SERIES BY HYDROGENATION OF THEIR CORRESPONDING AZO ETHERS

No Drawing.   Application filed September 21, 1929.   Serial No. 394,376.

The present invention relates to the catalytic reduction of azo ethers, whereby the azo group is completely hydrogenated and split into two amino groups, each one being attached to an aromatic residue, such hydrogenation accordingly occasioning the formation of two aromatic amino compounds.

Hitherto, the reduction of azo ethers by catalytic hydrogenation of the azo group, has been carried out by means of iron and water, or the like, or by hydrogenation of such compounds in the presence of solvents. For instance, para-diethoxy-azobenzene has been catalytically reduced in the presence of decahydro-naphthalene by means of hydrogen, (German Patent No. 406,064). Either of the so mentioned processes involves inherent disadvantages such as the separation, recovery, and loss of solvent and increased cost of production. The first of such processes has the added disadvantage of possible intermediate compound formation other than hydrogenation products, and consequent lower quality of product, or greater difficulty of product purification. Furthermore, salts of metals such as iron act catalytically in accelerating the oxidation of amines, which further hinders the easy and inexpensive preparation of a pure product.

We have found that azo ethers can be reacted with hydrogen under increased pressures and temperatures in the absence of a solvent, and in the presence of a hydrogenating catalyst, according to Equation I,

I.  X—O—R—N=N—R'+4H→
       X—O—R—NH$_2$+NH$_2$—R' wherein R and R' represent aromatic residues and X represents an alkyl, aryl, or aralkyl group.

To the accomplishment of the foregoing and related ends, our invention, then, consists of the method hereinafter fully described and particularly pointed out in the claims, the following description setting forth in detail several modes of carrying out the invention, such disclosed modes illustrating, however, but several of various ways in which the principle of the invention may be used.

For the purpose of illustration, we shall describe below our invention as applied to the preparation of para-phenetidine, by hydrogenation of para-ethoxy-azobenzene, according to Equation II,

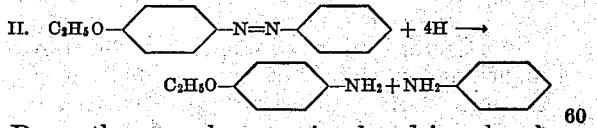

Para-ethoxy-azobenzene is placed in a bomb capable of being agitated, rotated, or the like, with the catalyst material which may or may not be supported on a substratum such as filter-cel or the equivalent, and heated to approximately 120° C. Hydrogen is then passed into the bomb at a pressure between approximately 200 and 500 pounds per square inch. The bomb is then agitated, such as by shaking, until the absorption of hydrogen ceases, thus indicating substantial cessation of the reaction, after which the bomb is opened. The reaction product is removed from the reactor, separated from the catalyst mass in any manner, such as by filtration, and the reaction products, namely para-phenetidine and aniline, are separated in any suitable way, such as for instance by distillation under reduced pressure.

The following detailed examples are given to illustrate our new and improved method, but it is to be understood that the examples are not to be interpreted as a limitation upon our invention.

Example 1

340 grams of para-ethoxy-azobenzene was reduced by hydrogen with the aid of 5 grams of a nickel-alumina catalyst, the latter being supported on filter-cel. The reduction was performed at approximately 120° C., at about 450 pounds pressure per square inch, and in a steel bomb which was agitated by shaking for approximately 6 hours, until the absorption of hydrogen ceased. The reaction mixture was filtered free from catalyst, and then distilled under sub-atmospheric pressure to separate the aniline and para-phenetidine formed in the reduction. A yield of 91 per cent of the theoretical amount of para-phenetidine was obtained.

Example 2

240 grams of para-ethoxy-phenyl-azo-ortho-toluene was treated in a similar manner as in Example 1, the catalyst being 30 grams of a nickel-filtercel material, the temperature of reduction 175 to 180° C., the hydrogen passed in under a pressure of 500 pounds per square inch, and the reaction time being 4½ hours. The products, ortho-toluidine and para-phenetidine, were separated by distillation as described above, the yields being 63 and 60 per cent respectively, of the theoretical amounts.

Example 3

60 grams of di-para-diethoxy-azobenzene was reduced by the method of Example 2, in 2 hours at 190 to 200° C. The para-phenetidine was distilled as above, after removal of catalyst. A yield of 65 per cent of the theoretical amount was obtained.

We do not limit our invention to the above-mentioned specific materials, or modes of operation. Other equivalent azo ethers may be reduced in a similar manner, for instance, ethers of the type,

wherein R' represents an aromatic group, X represents an alkyl, aryl, or aralkyl group, and wherein the various groups and the benzene residue may be further substituted with groups such as alkyl or ether groups.

Other hydrogenation catalysts than those mentioned in the examples may be utilized, for instance, a metal of the eighth group of Mendeleef's periodic system, or salt or oxide thereof, with or without the presence of a promoter, such as a metal of group I—B, II—B, III—B, or VII—A, or a salt or an oxide thereof. Such catalytic material may be employed singly or conjointly with one or more other catalytic components of the above mentioned series, and may be supported by other material than filter-cel, such as pumice, etc. We prefer to operate our process using a nickel or a promoted nickel catalyst.

Our modified and improved method may be carried out under pressures between the approximate limits of 100 to 1000 pounds per square inch, and at temperatures between the melting point of the azo ether employed and approximately 200° C. However, we prefer to operate at pressures between substantially 200 to 500 pounds, and at temperatures between about 120° C. and the boiling point of the azo ether or any product of its reduction.

Other types of apparatus and other construction materials for such may be employed than abovementioned, since our invention does not depend upon the apparatus used. For instance, stationary bombs equipped with a suitable means for agitation, or rotating or tubular autoclaves of material substantially inert to the reactants, may be employed.

To summarize, our invention concerns the preparation of amino ethers, such as para-phenetidine, by means of the catalytic reduction or hydrogenation under pressure of azo ethers, in the absence of a solvent.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making an amino ether, comprising reacting hydrogen with an azo ether, having the general formula,

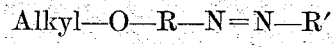

wherein R and R' represent aromatic residues of the benzene series which may be further substituted by substituents selected from the group consisting of alkyl and alkoxy substituents, the reaction being carried out under super-atmospheric pressure, in the presence of a hydrogenation catalyst, in the absence of a solvent, and at a temperature between the melting point of the azo ether and about 200° C.

2. The method of making an amino ether, comprising reacting hydrogen with an azo ether having the general formula,

the reaction being carried out under super-atmospheric pressure, in the presence of a hydrogenation catalyst, in the absence of a solvent, and at a temperature between the melting point of the azo ether and about 200° C.

3. The method of making an amino ether, comprising reacting hydrogen with an azo ether, having the general formula,

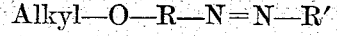

wherein R and R' represent aromatic residues of the benzene series, the reaction being carried out under a pressure between the limits of about 100 to about 1,000 pounds pressure per square inch, in the presence of a hydrogenation catalyst, in the absence of a solvent, and at a temperature between the melting point of the azo ether and about 200° C.

4. The method of making an amino ether, comprising reacting hydrogen with an azo ether, having the general formula,

wherein R and R' represent aromatic residues of the benzene series, the reaction being carried out in the presence of a catalyst selected from the group consisting of metals of the eighth group of the periodic system and salts and oxides of said metals, under a pressure within the limits of about 100 to about 1,000 pounds per square inch, in the absence of a solvent, and at a temperature between the melting point of the azo ether and about 200° C.

5. The method of making an amino ether, comprising reacting hydrogen with an azo ether, having the general formula,

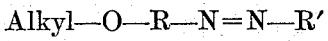

wherein R and R' represent aromatic residues of the benzene series, the reaction being carried out in the presence of a catalyst selected from the group consisting of metals belonging to the eighth group of the periodic system and salts and oxides of said metals, and in the presence of a catalyst-promoter selected from the group consisting of metals belonging to the groups I—B, II—B, III—B, VII—B, of the periodic system and salts and oxides of said metals, under a pressure within the limits of about 100 to about 1,000 pounds pressure per square inch, in the absence of a solvent, and at a temperature between the melting point of the azo ether and about 200° C.

6. The method of making an amino ether, comprising reacting hydrogen with an azo ether, having the general formula,

wherein R and R' represent aromatic residues of the benzene series, the reaction being carried out in the presence of a nickel-catalyst, under a pressure between the limits of about 100 to about 1,000 pounds pressure per square inch, in the absence of a solvent, and at a temperature between the melting point of the azo ether and about 200° C.

7. In a method of making an amino ether, having the general formula,

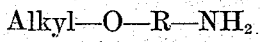

the steps which consist in reacting hydrogen with an azo ether having the general formula,

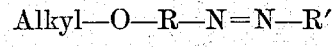

wherein R and R' represent aromatic residues of the benzene series, under super-atmospheric pressure, in the presence of a hydrogenation catalyst, in the absence of a solvent, at a temperature between the melting point of the azo ether and about 200° C., and fractionally distilling the reaction product to obtain separately, alkyl—O—R—NH$_2$ and R'—NH$_2$.

8. The method of making para-phenetidine, comprising reacting hydrogen with para-ethoxy-azobenzene, the reaction being carried out under super-atmospheric pressure, in the presence of a hydrogenation catalyst, in the absence of a solvent, and at a temperature between the melting point of para-ethoxy-azobenzene and about 200° C.

9. The method of making para-phenetidine, comprising reacting hydrogen with para-ethoxy-azobenzene, the reaction being carried out under a pressure between about 100 and about 1,000 pounds per square inch, in the presence of a hydrogenation catalyst, in the absence of a solvent, and at a temperature between the melting point of para-ethoxy-azobenzene and about 200° C.

10. The method of making para-phenetidine, comprising reacting hydrogen with para-ethoxy-azobenzene, the reaction being carried out in the presence of a catalyst selected from the group consisting of metals belonging to the eighth group of the periodic system and salts and oxides of said metals, under a pressure between 200 and 500 pounds per square inch, in the absence of a solvent, and at about the temperature 120° C.

11. The method of making para-phenetidine, comprising reacting hydrogen with para-ethoxy-azobenzene, the reaction being carried out in the presence of a catalyst selected from the group consisting of metals belonging to the eighth group of the periodic system and salts and oxides of said metals, and in the presence of a catalyst-promoter selected from the group consisting of metals belonging to the groups I—B, II—B, III—B, and VII—A, of the periodic system and salts and oxides of said metals, under a pressure within the limits of 200 and 500 pounds per square inch, in the absence of a solvent, and at approximately 120° C.

12. The method of making para-phenetidine, comprising reacting hydrogen with para-ethoxy-azobenzene, the reaction being carried out in the presence of a nickel-catalyst, under a pressure between 200 and 500 pounds per square inch, in the absence of a solvent, and at a temperature between the melting point of para-ethoxy-azobenzene and about 200° C.

13. In a method of making para-phenetidine, the steps which consist in catalytically hydrogenating para-ethoxy-azobenzene under super-atmospheric pressure, in the presence of a hydrogenation catalyst, in the absence of a solvent, at a temperature between the melting point of para-ethoxy-azobenzene and about 200° C., and fractionally distilling the reaction product under sub-atmospheric pressure to obtain separately para-phenetidine and aniline.

14. In a method of making para-phenetidine, the steps which consist in hydrogenating para-ethoxy-azobenzene, under a pressure between about 200 and about 500 pounds per square inch, at a temperature between 120° and 150° C., and in the presence of a nickel-containing catalyst, then separating the catalyst from the reaction mixture, and fractionally distilling the latter under sub-atmospheric pressure to obtain separately para-phenetidine and aniline.

Signed by us this 18th day of September, 1929.

RALPH P. PERKINS.
PETER S. PETRIE.